United States Patent Office 3,456,004
Patented July 15, 1969

3,456,004
PROCESS OF PREPARING UNSATURATED ALDEHYDES AND ACIDS
Jamal S. Eden, Akron, Ohio, assignor to The B. F. Goodrich Company, New York, N.Y., a corporation of New York
No Drawing. Filed Aug. 30, 1965, Ser. No. 483,869
Int. Cl. C07c 57/04, 51/20; B01j 11/82
U.S. Cl. 260—533
7 Claims

ABSTRACT OF THE DISCLOSURE

Unsaturated acids and aldehydes are prepared by reacting propylene and isobutylene with oxygen at an elevated temperature in the presence of a catalyst containing molybdenum oxide, tellurium oxide and a tin phosphate to form acrolein and acrylic acid, and methacrolein and methacrylic acid.

---

This invention relates to new and useful catalysts and to a method of preparing unsaturated aldehydes and unsaturated carboxylic acids by oxidation of unsaturated hydrocarbons at an elevated temperature, and relates more particularly to catalysts comprising a mixture of a molybdenum oxide, tellurium oxide and a tin phosphate in a molar ratio of 100 $MoO_3$, 10–100 $TeO_2$ and 10–100 of a tin phosphate and to a method of preparing acrolein, methacrolein, acrylic acid or methacrylic acid by passing vapors of propylene or isobutylene and an oxygen containing gas through the catalyst at a temperature of from about 325° C. to about 550° C. The catalyst can also be designated as $Mo_{10}Te_{1-10}Sn_{2-20}P_{2-20}O_{39-120}$ with the P being in the form of a phosphate i.e., each P is attached to 3 or 4 oxygen atoms.

Numerous attempts have been made in the past to prepare products of higher oxidation state from hydrocarbons, especially from the normally gaseous hydrocarbons. However, all prior catalysts and procedures for oxidizing monoolefinic gaseous hydrocarbons to monoolefinically unsaturated aldehydes or monoolefinically unsaturated carboxylic acids with the same number of carbon atoms as the hydrocarbon have serious short-comings. The catalysts either have a very short active life, or they convert only a portion of the hydrocarbon to desired end groups per pass; they oxidize the hydrocarbon excessively to form high proportions of carbon monoxide or carbon dioxide or both; they are not sufficiently selective, so that the hydrocarbon molecule is attacked at both the olefinic unsaturation and at a methyl group; or the oxidation of the olefin does not proceed beyond the aldehyde stage.

It is therefore unexpected to find a catalyst having unusually long life that will convert a substantial amount, more than 50% per pass, of a gaseous monoolefin such as propylene or isobutylene to yield very high proportions of acrolein, methacrolein and acrylic acid or methacrylic acid. It is also unexpected to find a catalyst that produces a wide ratio of olefinic aldehyde to monoolefinically unsaturated caroxylic acid by controllable changes in reaction conditions or catalyst composition. Mol percent efficiencies of about one to 10 for the aldehyde and about 35 to 50 for the unsaturated carboxylic acid have been obtained with the catalyst and process of this invention. Usually when the efficiency for conversion of the hydrocarbon to aldehyde is high the efficiency for the conversion to acid is low and vice versa. This provides a great degree of flexibility in the process, so as to provide means for obtaining a product mix that is needed at any particular time during commercial operation.

THE REACTANTS

The essential reactants are (1) propylene or isobutylene and (2) an oxygen containing gas, which can be pure oxygen, oxygen diluted with an inert gas, oxygen enriched air or air without additional oxygen. For reasons of economy, air is the preferred oxygen containing reactant.

For the purpose of this invention the hydrocarbons which are oxidized can be defined generically by the formula

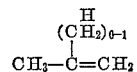

wherein it is also apparent that the end products formed result from the oxidation of only one methyl group on the hydrocarbon molecule while the terminal $CH_2\!=\!C\!<$ remains intact.

Stoichiometric ratios of oxygen to olefin for the purpose of this invention are 1.5 to 1. Slightly lower amounts of oxygen can be used at a sacrifice of yield. It is preferred, however, to use 33 to 66% excess oxygen. Larger excesses do not impair the yields of aldedyes and acids, but for practical considerations an excess much above 100% would require extremely large equipment for a given production capacity.

The addition of steam into the reactor along with the hydrocarbon and oxygen containing gas is desirable but not absolutely essential. The function of steam is not clear, but it seems to reduce the amount of carbon monoxide and dioxide in the effluent gases.

Other diluent gases can be used. Surprisingly, saturated hydrocarbons such as propane are rather inert under the reaction conditions. Nitrogen, argon, krypton or other known inert gases can be used as diluents if desired but are not preferred because of the added cost.

THE CATALYST AND ITS PREPARATION

There are several methods for the preparation of the catalyst, which can be supported or unsupported. It is possible to dissolve each of the starting ingredients in water and combine them from the aqueous solutions or the ingredients can be dry blended. Because of the more uniform blend obtained by the solution procedure, it is preferred.

The general procedure for preparing a catalyst from water soluble ingredients is to dissolve the requisite amount of a molybdenum salt, a tellurium salt and a tin salt in water. Add the requisite amount of phosphoric acid to the tin salt solution. Add the tellurium salt solution to the molybdenum salt solution and then add the tin salt-phosphoric acid mixture to the molybdenum-tellurium salt mixture. The catalyst is then dried and baked at 400° C. for about 16 hours.

Supported catalysts can be prepared by adding a dry support or an aqueous slurry thereof to the aqueous solution of catalyst or the aqueous catalyst ingredients can be added to the slurry of the support.

Alternatively a slurry of the catalyst ingredients can be prepared in water, then dried and baked. For supported catalysts the aqueous slurry of the catalyst ingredients can be added to an aqueous suspension of the support or vice versa, and then dried and baked.

Another method is to blend the dry ingredients of the desired particle size and then mix them thoroughly. Thorough blending and uniform particle size is desired.

A specific example of the solution method is now set forth.

In this procedure the ingredients are precipitated on blending.

(a) Dissolve 105.96 g. of ammonium molybdate ($4H_2O$) in 130 ml. distilled water at about 50° C.

(b) Dissolve 31.922 g. TeO₂ in 80 ml. concentrated HCl and filter if necessary.

Add the tellurium salt solution to the ammonium molybdate solution. A precipitate forms.

(c) Dissolve 70.12 g. SnCl₄·5H₂O in water and add 46.2 g. of 85% H₃PO₄. Add this mixture slowly to the precipitated ammonium molybdate-TeO₂ mixture.

Dry on a steam bath and bake for 16 hours at 400° C. Thereafter, the catalyst is ground to the desired mesh size and sieved. For supported catalysts an aqueous slurry of the support can be added to the catalyst ingredients, or vice versa, prior to drying and baking.

A supported catalyst may be prepared by adding to (c) 240 grams of an aqueous colloidal dispersion of microspheroidal silica in a concentration of 30–35% $SiO_2$ (Ludox H.S.). The silica may also be added to one of the individual ingredients or (c) added to the silica dispersion.

Among the suitable supports are silica, silica containing materials, such as diatomaceous earth, kieselguhr, silicon carbide, clay, aluminum oxides and even carbon, although the latter tends to be consumed during the reaction.

The exact chemical structure of the catalysts made by the above procedures is not known, but catalysts with molar ratios of 100 Mo, 10–100 Te and 10–100 of a tin phosphate can be used for oxidizing the monoolefinic hydrocarbon to aldehyde and/or carboxylic acid. The catalyst contains chemically bound oxygen so that the generic formula can be written as $MoO_{3\ 100}TeO_2$ 10–100 $SnP_2O_7$ or other tin phosphate 10–100. The phosphate can be a $PO_4$ radical, a pyrophosphate, or a polyphosphate, for example, tin orthophosphate (ous), monohydrogenphosphate (ous), dihydrogenphosphate (ous), basic orthophosphate (ic), pyrophosphate, and metaphosphate.

A preferred catalyst is one having a ratio of 75 $MoO_3$, 25 $TeO_2$ and 25 $SnP_2O_7$ because it gives high yields of desired products, and the preferred support is silica, because of its low cost and good fluidizing characteristics.

REACTION CONDITIONS

The reaction can be carried out in either a fixed or fluidized catalyst bed.

The reaction temperature can range from about 300 to 450° C. for the oxidation of propylene but the preferred range is from about 350 to about 425° C. Below 350° C. the conversion per pass is lower than desirable and low temperature tends to produce more aldehyde than desired. Usually, a longer contact time is needed at lower temperatures to obtain the yields of desired products obtainable at a higher temperatures. Above 425° C. in the propylene oxidation some of the desired end products appear to be oxidized to carbon oxides. This is much more apparent at 450° C. For isobutylene, oxidation temperatures of 375–550 are desirable with the preferred range being 300–450° C.

The molar ratio of oxygen to propylene or isobutylene should be at least 2 to 1 for good conversion and yields. Some excess oxygen, 33 to 66 mol percent is even more desirable and is preferred. There is no critical upper limit as to the amount of oxygen, but when air is used as the oxygen containing gas it becomes apparent that too great an excess will require large reactors, pumping, compressing and other auxiliary equipment for any given amount of desired end product. It is therefore best to limit the amount of air to provide a 33 to 66% excess of oxygen. This range provides the largest proportion of acid, under given reaction conditions. Also, since care is needed to avoid an explosive mixture, the limiting of air aids in that direction.

The molar ratio of steam to propylene or isobutylene can range from 0 to about 5 to 7, but best results are obtained with molar ratios of about 3.2 to 4.25 per mol of olefin and for this reason are preferred.

The contact time can vary considerably in the range of about 2 to 70 seconds. Best results are obtained in a range of about 8 to 54 seconds and this range is preferred. Longer contact times usually favor the production of acid at any given temperature.

The particle size of catalyst for fixed bed operations used is from 10–18 mesh. As is known, for fixed beds, the size may be of a wider range particle size.

For fluid bed systems the catalyst size should be from 80–325 mesh (U.S. Sieve).

The reaction can be run at atmospheric pressure, in a partial vacuum or under induced pressure up to 50–100 p.s.i. Atmospheric pressure is preferred for fixed bed systems and a pressure of 1 to 100 p.s.i. for fluid bed reactions. Operation at a pressure which is below the dew point of the unsaturated acid at the reaction temperature is advantageous.

The data in the examples show that wide variations in percentages of unsaturated acids and aldehydes can be obtained with a single catalyst, using fixed ratio of reactants but changing the temperature and/or contact time. Further variation is obtainable by controlling the other variables in the reaction including the catalyst compositions within the limits set forth herein.

The examples are intended to illustrate the invention but not to limit it.

THE EXAMPLES

A series of runs was made in a fixed bed reactor of a high silica (Vycor) glass tube 12 inches long and 30 mm. outer diameter. The reactor had three inlets, one for air, one for steam and one for propylene. Three external electrically operated heating coils were wound on the reactor. One of the coils extended along the entire length of the reactor and each of the remaining coils extended only about one half the length of the reactor.

Outlet vapors were passed through a short water cooled condenser. Uncondensed gases were passed through a gas chromatograph (Perkin-Elmer model 154D) and analyzed continuously. The liquid condensate was weighed and then analyzed for acrylic acid and acrolein in the gas chromatograph.

The reactor was filled to about 90% of its capacity with 170 ml. of a catalyst made by the solution method described above, using a ratio of 75 $MoO_3$, 25 $TeO_2$ and 25 $SnP_2O_7$. Empirically the catalyst is $$Mo_{100}Te_{33.33}Sn_{33.33}P_{66.6}O_{600}$$

and the P is present as $P_2O_7^{-4}$. The catalyst was not supported and had a mesh size of 10–18 (U.S. Sieve).

Steam at a temperature of 200–250° C. was first passed into the reactor. Then propylene and air were separately fed into the stream of water vapor. This mixture then passed through a pre-heater and entered the reactor at about 200–250° C. The reactor was preheated to about 285° C. before the gas feed was begun.

The ratio of reactants was about 2.955 mols of oxygen and 4.36 mols of steam per mol of propylene. Cold contact time was 42.5 seconds.

The reaction temperature was varied as the reaction proceeded.

The table below summarizes the data obtained in these runs:

| Run No. | Temp., °C. | Mol percent propylene converted | Mol percent yield on propylene converted | | Mol percent efficiency | |
|---|---|---|---|---|---|---|
| | | | Acr. | AA | Acr. | AA |
| 1 | 360 | 100 | 9.95 | 44.77 | 9.95 | 44.77 |
| 2 | 375 | 100 | 4.76 | 50.73 | 4.76 | 50.73 |

Acr.=Acrolein; AA=Acrylic Acid.

I claim:

1. A method of preparing a mixture of unsubstituted monoolefinic aldehydes and monoolefinic monocarboxylic acids by oxidation of a methyl group of a hydrocarbon having the structure $$\underset{CH_3-C=CH_2}{(\overset{H}{\underset{|}{C}H_2})_{0-1}}$$

comprising passing over a catalyst a mixture of gases having a molar ratio of 1 mol of said monoolefinic hydrocarbon, an oxygen containing gas containing about 1.5 to 4 mols of oxygen and up to 7 mols of water vapor per mol of said monoolefinc hydrocarbon, at a temperature of from about 325° C. to about 500° C., the said catalyst consisting essentially, on a molar basis, of $$Mo_{10}Te_{1-10}Sn_{2-20}P_{2-20}O_{39-120}$$

in which each P is combined with 3 to 4 atoms of oxygen and the Sn to P ratio ranges from 1Sn to 2P to 3Sn to 4P.

2. A method of preparing a mixture of acrolein and acrylic acid comprising passing a mixture of propylene, and an oxygen containing gas containing from about 1.5 to 4 mols of oxygen per mole of propylene through a bed of a catalyst having the empirical formula $$Mo_{10}Te_{1-10}Sn_{2-20}P_{2-20}O_{39-120}$$

in which each P atom is combined with 3 to 4 atoms of oxygen and the Sn to P ratio ranges from 1Sn to 2P to 3Sn to 4P, at a temperature of from about 350° C. to about 450° C.

3. The method of claim 2 in which the Sn to P ratio is 1 to 2.

4. The method of claim 2 wherein the catalyst contains a major proportion of $MoO_3$ and smaller proportions of $TeO_2$ and $SnP_2O_7$ in a molar ratio of 100 $MoO_3$, 10–100 $TeO_2$ and 10–100 $SnP_2O_7$.

5. A method of preparing a mixture of acrolein and acrylic acid comprising passing a mixture of propylene, an oxygen containing gas containing from about 1.5 mols of oxygen per mol of propylene and up to 7 mols of water vapor per mol of propylene through a bed of a catalyst consisting essentially of $Mo_{100}Te_{33.33}Sn_{66.66}P_{66.66}O_{600}$ in which the P is present as $P_2O_7$ at a temperature of from about 360 to about 425° C.

6. A method of preparing a mixture of methacrolein and methacrylic acid comprising passing a mixture of isobutylene and an oxygen containing gas in an amount sufficient to provide from about 1.5 to about 3 mols of oxygen per mol of isobutylene, through a bed of a catalyst consisting essentially of $Mo_{10}Te_{1-10}Sn_{2-20}P_{2-20}O_{39-120}$ in which the Sn to P ratio ranges from $Sn_5$ to $P_6$ to $Sn_3$ to $P_2$, and in which each P is combined with 3 to 4 atoms of oxygen.

7. The method of claim 6 wherein the catalyst contains $MoO_3$, $TeO_2$ and $SnP_2O_7$ in a molar ratio of 100 $MoO_3$, 10–100 $TeO_2$ and 10–100 $SnP_2O_7$.

References Cited

UNITED STATES PATENTS

| | | | |
|---|---|---|---|
| 2,881,212 | 4/1959 | Idol et al. | 260—530 |
| 3,192,259 | 6/1965 | Fetterly et al. | 260—533 |

FOREIGN PATENTS

| | | |
|---|---|---|
| 903,034 | 8/1962 | Great Britain. |

OTHER REFERENCES

Derwent Delayed Belgian Report, No. 28, Aug. 21, 1964, General Organic Section, p. 1.

LORRAINE A. WEINBERGER, Primary Examiner

D. STENZEL, Assistant Examiner

U.S. Cl. X.R.

252—437; 260—604